July 16, 1968 — R. F. DETMAN ET AL — 3,393,127
THERMOSIPHON DEEP POOL REACTOR
Filed Jan. 6, 1966 — 2 Sheets-Sheet 1
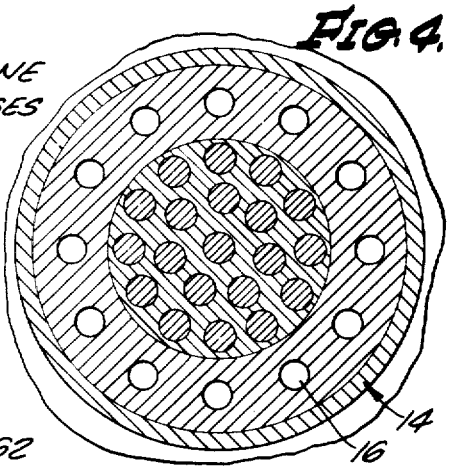
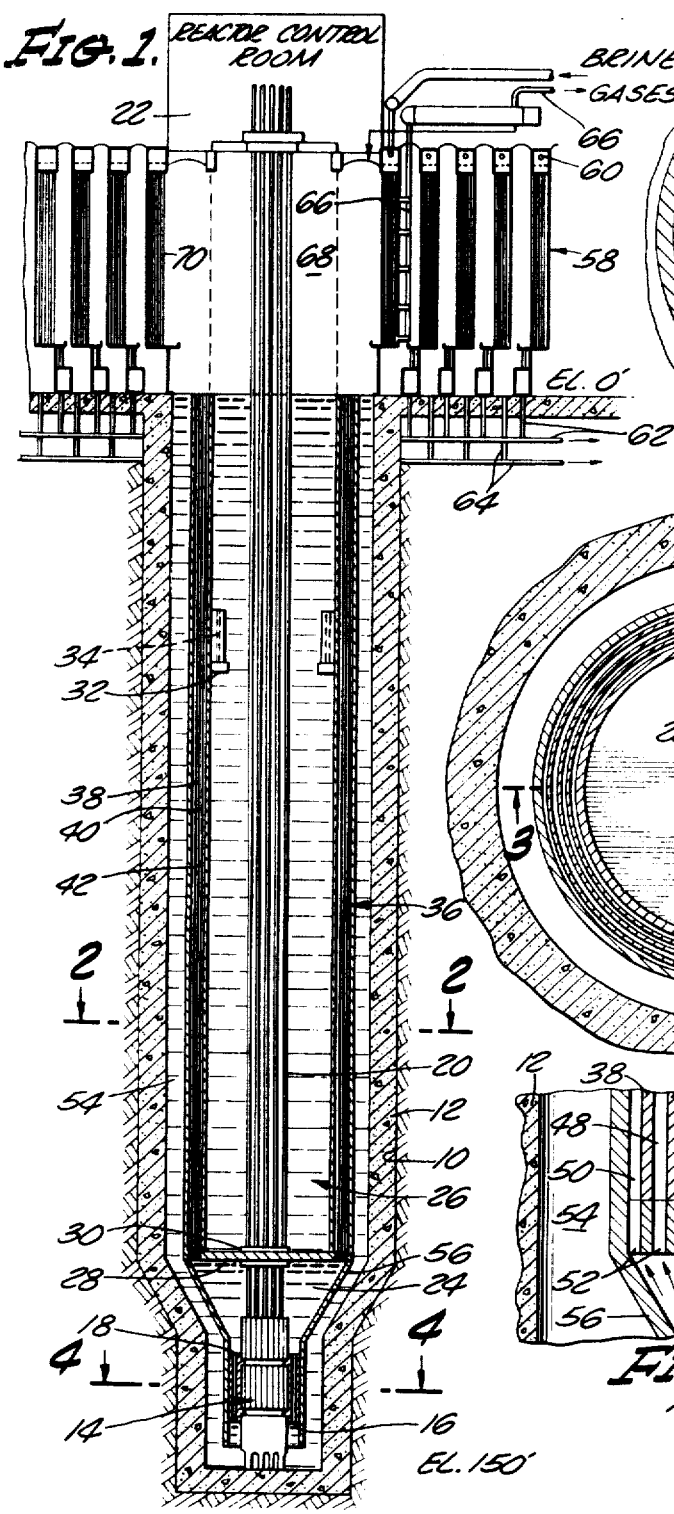
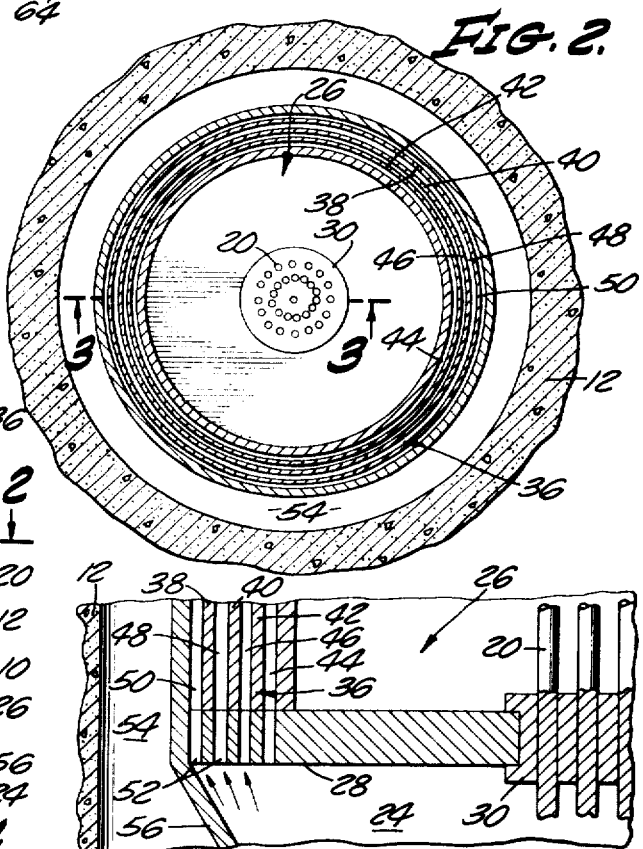
INVENTORS.
ROGER F. DETMAN
JAMES V. WHIPP, JR.
BY Lyon & Lyon
ATTORNEYS

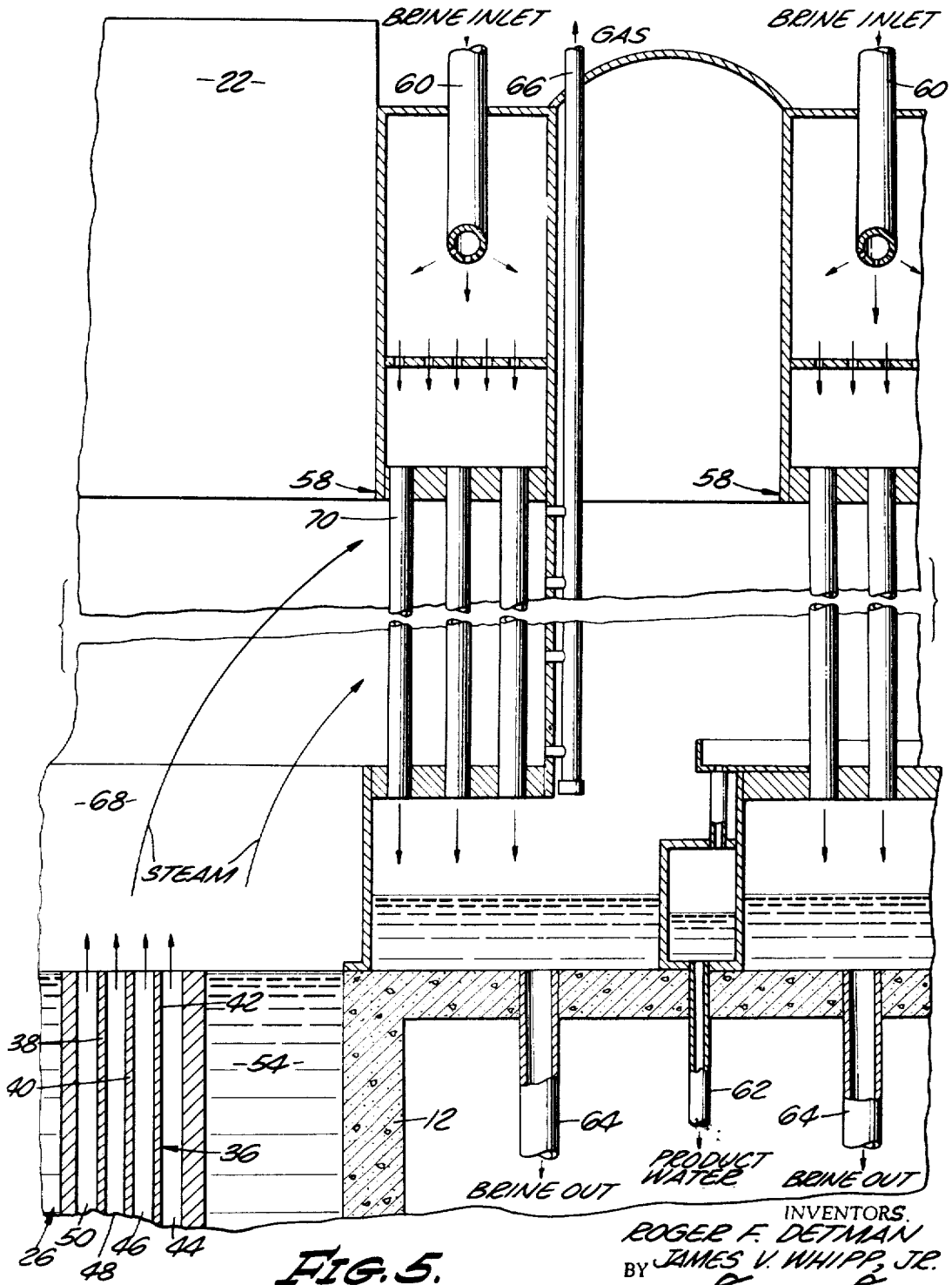

United States Patent Office 3,393,127
Patented July 16, 1968

3,393,127
THERMOSIPHON DEEP POOL REACTOR
Roger F. Detman, South Pasadena, Calif., and James V. Whipp, Jr., McLean, Va., assignors to C. F. Braun & Co., Alhambra, Calif., a corporation of California
Filed Jan. 6, 1966, Ser. No. 519,169
8 Claims. (Cl. 176—61)

ABSTRACT OF THE DISCLOSURE

This patent describes a thermosiphon comprising within a bore hole a nuclear reactor having a liquid inlet side and a liquid outlet side, three separate concentric annular chambers above the reactor, control means for operating the reactor traversing the innermost chamber, said innermost chamber and said reactor being separated by an essentially water-tight barrier, the outermost annular chamber comprising a conduit for conducting liquid from the upper end thereof to the inlet side of the reactor, the intermediate chamber between said innermost and said outermost chambers comprising at least one annular conduit for conducting liquid from above the reactor to the upper end of said intermediate chamber. Also described is a system for the generation of steam in a closed loop comprising continuously heating water under hydrostatic pressure in a bore hole in proximity to a nuclear reactor, gradually reducing the hydrostatic pressure on the water to permit at least partial vaporization thereof and continuously condensing the vapor and permitting the condensate together with the unvaporized water to be recycled by thermosiphoning action to the heating zone.

---

This invention relates to a novel thermosiphon system adapted to the production of steam.

Various nuclear reactor heat sources have been proposed for use in the desalination of water. In one prior art design, there is described a nuclear reactor heat source immersed in a pool of water which is approximately 150 feet deep. The water is circulated by means of pumps and a closed piping system through the reactor and brine heat exchangers in a pit adjacent to the reactor pool, thereby transferring the heat generated in the reactor core to the stream of brine flowing through the heat exchangers. The heated brine is conveyed through piping out of the brine exchanger pit to a conventional multistage flash-type desalting plant. This design requires the use of a heat exchanger well, circulating pumps, liquid-liquid exchanger piping, switch gear and controls. In addition, the system requires a separate well for fuel element storage and the heat removal system associated with it. In addition, the radioactive gas removal system is rather complicated.

In contrast thereto, the present invention is concerned with a thermosiphon for use in a plant adapted to produce potable water from salt water. The utility of the invention resides in the fact that the production of fresh water from salt water is carried out at lower cost than by the procedures of the prior art. The thermosiphon principle as hereinafter described eliminates pumping during normal operation since water circulation is not dependent upon the use of mechanical energy. The thermosiphon also eliminates the need for various heat exchanger wells, circulating pumps, liquid-liquid exchangers, piping, switch gear, separate fuel element storage and the like.

Accordingly, it is a principal object of the present invention to provide a novel thermosiphon particularly adapted for use in a desalination plant to produce fresh water from salt water at lower cost.

More particularly, it is an object of the present invention to provide a novel closed cycle thermosiphon which may be used to transfer energy to brine in a more efficient manner, and without the need for the elaborate equipment and safety precautions associated with systems of the prior art.

It is a principal object of the invention to provide a thermosiphon which is characterized by water circulation which is not dependent upon the use of pumping or other mechanical circulation means.

These and other objects of the present invention will become apparent from the more detailed description which follows.

Briefly, the present invention comprises a thermosiphon, normally arranged in a bore hole in the ground, comprisig a nuclear reactor having a liquid inlet side and a liquid outlet side, above said reactor three separate concentric annular chambers, control means for operating the reactor traversing said innermost chamber, said innermost chamber and said reactor being separated by an essentially liquid-tight barrier, the outermost annular chamber comprising a conduit for conducting liquid from the upper end thereof to the inlet side of the reactor, normally the size of the outermost chamber being sufficient to contain a reserve of water adequate to quench the reactor, the intermediate chamber between said innermost and outermost chambers comprising at least one annular conduit for conducting fluid from above the reactor to the upper end of said intermediate chamber. The bottom end of said intermediate chamber normally contains one or more variable opening restrictions to control the flow of water entering this chamber. The restrictions serve the two-fold purpose of controlling the flow and maintaining adequate pressure at the reactor level sufficient to suppress boiling of water in the reactor. The invention also comprises the generation of steam by a novel closed-cycle method.

The invention will be better understood by reference to the accompanying drawing which serves to illustrate the invention and in which:

FIGURE 1 is a cross-sectional view of one embodiment of the thermosiphon in operation.

FIGURE 2 is a cross-sectional view taken along the line 2—2 in FIGURE 1.

FIGURE 3 is a sectional view taken along the line 3—3 in FIGURE 2.

FIGURE 4 is a cross-sectional view taken along the line 4—4 of FIGURE 1.

FIGURE 5 is an enlarged cross-sectional view of the upper right hand area of FIGURE 1.

The thermosiphon of the present invention is normally disposed within a bore hole 10 which has been drilled into the earth. The bore hole is preferably, although not necessarily, provided with a liner 12 made of concrete or some other liquid-tight material. At the bottom of the bore hole is positioned nuclear reactor 14 having a liquid inlet 16 and a liquid outlet 18. The control of the fuel elements of the reactor may be provided by conventional control rods connected to control rod extensions 20 which run from reactor 14 to control room 22. The area 24 immediately above the reactor is normally separated from the interior of annular chamber 26 by barrier 28 containing seal 30 to permit movement of control extension rods 20 therethrough. Along the upper interior walls of chamber 26 are racks 32 adapted to hold in place spent fuel elements 34. Surrounding innermost annular chamber 26 is intermediate annular chamber 36 normally containing a plurality of annular dividers. In the device shown in the drawing, three annular dividers 38, 40 and 42 are provided thus creating therebetween fluid passages 44, 46, 48 and 50. These passages are in fluid communication with area 24 via openings 52 in barrier 28. Between intermediate annular chamber 36 and concrete liner 12 is the outermost annular chamber 54. Chamber 54 is separated from the space 24 by the conically shaped member 56 which extends from reactor 14 to the bottom of barrier 28. The openings 52 are provided with variable restrictions to control the flow of water entering the intermediate annular chamber 36. These restrictions serve to both control the flow of liquid, and maintain sufficient pressure around reactor 14 to suppress boiling of liquid in reactor 14.

At ground level there is provided a plurality of concentric long tube vertical evaporators 58, and means for introducing brine 60 and for removing potable desalted water at 62. The steam from the thermosiphon gives up its heat to the brine in the first of the evaporators 58 as is shown in FIGURE 5. The steam condensed by this evaporator is returned to outermost annulus 54 to provide continuous closed-cycle operation of the thermosiphon. The steam produced in the first evaporator is used to furnish heat to the second evaporator with the condensed water being removed as product at 62. The used brine is removed at 64. Any non-condensible gases generated in reactor 14 or elsewhere in the thermosiphon system may be removed via line 66. These gases comprise gaseous fission products released by the reactor 14, such as krypton, argon, etc., plus any air present in the initial distilled water charged to the system. Any number of these evaporator effects may be arranged concentrically around the surface of bore hole 10. The actual desalination step itself and the apparatus employed therein does not form a part of the present invention and accordingly it is not further described herein.

In operation, the thermosiphon of the present invention is initially charged to elevation 0 with distilled water which completely fills all three chambers. The water circulation through reactor 14 is then started by initiation of reactor operation at a controlled rate by partially withdrawing control rods from the reactor core. The rate of increase of heat generated in the reactor core is governed by the temperature of the water at some preselected control point location in the circulating system, for example at the upper level of the intermediate annulus 36. Initially circulation occurs as a result of the fact that the water heated in the core expands and suffers a decrease in density thus creating an imbalance in static head between the water column in the outermost annulus 54, and the water column in the intermediate annulus 36. This imbalance causes the water in the intermediate annulus 36 to be displaced upward, whence it overflows at elevation 0 into the outermost annulus 54. Thus water begins to circulate upward in the intermediate annulus, downward in the outermost annulus 54 and upward through the reactor 14. As the temperature of the water at the control point rises, the amount of heat generated by the reactor is increased by withdrawing the control rods an additional distance out of the reactor core. When the water temperature reaches the equilibrium boiling temperature corresponding to the pressure in chamber 68, boiling will occur at the water surface in chamber 68. At this time, if not sooner, brine circulation is started in line 60. The steam generated as a result of the boiling condenses on the vertical tubes 70 around the periphery of chamber 68. Further increase of heat generation in the reactor causes boiling to occur below the surface in the intermediate annulus simultaneously causing a rise in pressure in chamber 68. As heat generation is still further increased the level at which boiling begins in the intermediate annulus becomes lower until it reaches the level of the variable restrictions at openings 52. At the design rate of heat generation the pressure in chamber 68 is controlled by the rate of brine admitted to the condensing tubes through line 60. The driving force for circulation increases rapidly with the advent of boiling below the surface in the intermediate chamber, and is, at all times, sufficient to exactly balance the frictional resistance to flow in the circulating system. It has been found that the water will circulate naturally through outer annular space 54 through the reactor and area 24 and up the intermediate annular chamber 36 without the need for any auxiliary pumping apparatus. This natural flow of water will, as will be appreciated by those skilled in the art, provide a substantial savings by the elimination of the cost of pumping equipment and its operation. The elimination of the need for such equipment is one of the principle features of the thermosiphon apparatus of the present invention.

The innermost chamber 26 contains racks 32 for the storage of spent fuel elements 34. The heat generated by the spent fuel elements 34 causes local recirculation with the generation of steam at the surface of the water within innermost chamber 26. This steam from innermost chamber 26 is combined with the steam emitted from intermediate chamber 36 in the steam space 68 above the water level in innermost chamber 26 and is condensed on the tubes 70 in the first of the long tube vertical evaporators 58. The water in innermost chamber 26 is prevented from direct contact with the water in area 24 because of the water-tight barrier 28. The presence of this barrier is generally necessary in order to provide the thermosiphoning effect.

The use of the thermosiphon system of the present invention for transferring the heat generated by the reactor 14 to the brine is less costly than using a pump circulating water system for the following reansons: (1) an expensive pit for brine heat exchangers is not required since heat is transferred to the brine above ground by condensing steam generated in the thermosiphon system; (2) the cost of pumping the water coolant through the reactor and brine exchangers is eliminated since the thermosiphon system circulates the coolant without the use of pumps; (3) the cost of pumps and the cost of maintaining the pumps is eliminated.

The thermosiphon of the present invention is particularly adapted for use with a concentric-type long tube vertical evaporator desalting plant. This combination requires no additional heat transfer equipment to transfer heat from the reactor to the desalting plant, because the steam produced by the thermosiphon is usable directly in the first effect of the concentric-type long tube vertical evaporators 58. A desalting plant of this type utilized in combination with the thermosiphon of the present invention is more compact and requires a smaller plant site since, as previously indicated, the desalting plant may be located at the top of the reactor instead of adjacent to it. In addition, since the brine exchanger pit and separate fuel storage pits are not required, less ground space is necessary. The thermosiphon does not require a separate spent fuel storage pit and a separate spent fuel heat removal system since the spent fuel is stored in the innermost annular chamber 26 and heat is removed by convection and vaporization to the evaporators 58 located above the thermosiphon.

As can be seen, the reactor is situated at the center of a deep bore hole. The depth of the water above the reactor prevents vaporization around the reactor and thereby improves heat transfer. The generation of steam at the upper levels in the intermediate chamber 36 gives rise to highly turbulent two-phase flow. Based upon presently available thermodynamic data, an equivalent diameter of 4 inches is preferred in the annular chamber 36. To insure stable flow and provide good control within chamber 36, variable restrictions are provided at openings 52. These restrictions are utilized to control the pressure drop across the openings 44, 46, 48 and 50. The desired annular space within chamber 36 may be provided by the positioning of annular dividers 38, 40 and 42. In general, in order to maintain the two-phase flow under conditions of optimum control, the annular separation provided by the dividers lies within the range of from 1 to 6 inches. It will be understood, of course, that the exact pressure drop required across the restrictions and the exact spacing of the dividers is dependent upon the particular design. Accordingly, these variables may be altered by those skilled in the art without departing from the present invention.

In general, the size of the outermost annular space 54 is sufficient to contain a reserve of water to quench the reactor 14 in the event of an accidental excursion of the nuclear power. Various alternate methods of controlling the rods 20 and the reactor 14 may be utilized as will be readily apparent to those skilled in the art. The construction of reactor 14 is conventional, and any of the ordinary nuclear reactors known in the stationary energy source art may be utilized.

In a typical design, reactor 14 is placed in the bottom of a concrete lined 150 foot bore hole. The innermost, intermediate and outer annular chambers extend from 120 feet below ground level to ground level. The fuel storage racks 32 are positioned intermediate along this length. In operation, as the distilled water is continuously circulated at the top of the outermost annular space, it is at a temperature of 240° F. and a pressure of about 24.97 p.s.i.a. The distilled water flowing into the inlet side 16 of the reactor, emerges from the reactor at 18 at a temperature of about 290° F. and a pressure of 75.4 p.s.i.a., in essentially all liquid form. The heated water then passes through the restrictions at the lower end of the intermediate annular chamber 36 and then into the intermediate annular space itself at which point the water is at a temperature of 270° F. and a pressure of 41.86 p.s.i.a. At this point the water has a weight fraction of vapor of about 0.022 and a volume fraction of liquid of 0.0705. When the water has reached the upper end of the intermediate annular space at ground level, the temperature of the two-phase flow has returned to 240° F. and a pressure of 24.97 p.s.i.a. with a weight fraction of vapor of 0.0535 and a vapor fraction of liquid of 0.0180. The foregoing figures are merely illustrative. The conditions for steam generation in the thermosiphon may be varied over a wide range of temperatures and pressures without departing from the scope of the invention. For example, the temperature of the steam generated in chamber 68 may range up to 270–300° F. or higher, with the upper limit being imposed only by the need to avoid the formation of excessive scale deposits in the tubes of the evaporators. The maximum water temperature at reactor 14 may be 300° F. or more, and is a function of the materials of construction of the reactor, the steam temperature selected, and the like. Based on the foregoing, those skilled in the art will be able to determine suitable operation conditions for any given desalination plant.

Thus, it can be seen that the thermosiphon of the present invention provides essentially all of the heat transfer required while the water is in the liquid state, and that all of the conversion to the vapor occurs after heat transfer to the liquid has been completed. In addition, the formation of the two-phase flow in the intermediate annular chamber provides the thermosiphoning effect which eliminates the need for the use of auxiliary pumping equipment.

While the thermosiphon has been described with particular reference to use in a desalination plant, it will be understood that it has many other uses, for example, in steam and power generation.

Having fully described the invention, it is intended that it be limited only by the lawful scope of the appended claims.

We claim:

1. A thermosiphon comprising, within a bore hole, a nuclear reactor having a liquid inlet side and a liquid outlet side, three separate concentric annular chambers above said reactor, control means for operating said reactor traversing the innermost chamber, said innermost chamber and said reactor being separated by an essentially liquid-tight barrier, the outermost annular chamber comprising a conduit for conducting liquid from the upper end thereof to the inlet side of the reactor, the intermediate chamber between said innermost and outermost chambers comprising at least one annular conduit for conducting liquid from above the reactor to the upper end of said intermediate chamber.

2. A thermosiphon comprising, within a bore hole, a nuclear reactor having a liquid inlet side and a liquid outlet side, and longitudinally disposed with said bore hole, three separate concentric annular chambers of approximately equal length above said reactor, control means for operating said reactor traversing said innermost chamber, the innermost chamber and said reactor being separated by an essentially liquid-tight barrier, the outermost annular chamber comprising a conduit for conducting liquid from the upper end thereof to the inlet side of the reactor, the size of the outermost chamber being sufficient to contain a reserve of water adequate to quench the reactor, the intermediate chamber between said innermost and outermost chambers comprising at least one annular conduit for conducting liquid from above the reactor to the upper end of said intermediate chamber.

3. A thermosiphon comprising, within a bore hole, a nuclear reactor having a liquid inlet side and a liquid outlet side, three separate concentric annular chambers of approximately equal length above said reactor, control means for operating said reactor traversing the innermost chamber, said innermost chamber and said reactor being separated by an essentially liquid-tight barrier, the outermost annular chamber comprising a conduit for conducting liquid from the upper end thereof to the inlet side of the reactor, the size of the outermost chamber being sufficient to contain a reserve of water adequate to quench the reactor, the intermediate chamber between said innermost and outermost chambers comprising at least one annular conduit for conducting liquid from above the reactor to the upper end of said intermediate chamber, the lower end of said intermediate chamber containing a plurality of variable opening restrictions to control liquid flow entering said intermediate chamber and being adapted to suppress the vaporization of liquid in the reactor.

4. A thermosiphon comprising, within a bore hole, a nuclear reactor having a liquid inlet side and a liquid outlet side, three separate concentric annular chambers of approximately equal length above said reactor, control means for operating said reactor traversing the innermost chamber, said innermost chamber being provided with spent fuel storage racks intermediate the length thereof, said innermost chamber and said reactor being separated by an essentially liquid-tight barrier, the outermost annular chamber comprising a conduit for conducting liquid from the upper end thereof to the inlet side of the reactor, the size of the outermost chamber being sufficient to contain a reserve of water adequate to quench the reactor, the intermediate chamber between said innermost and outermost chambers comprising at least one annular conduit for conducting liquid from above the reactor to the upper end of said intermediate chamber, the lower end of said intermediate chamber containing a plurality of variable opening restrictions to control liquid flow entering said intermediate chamber and being adapted to suppress the vaporization of liquid in the reactor.

5. A thermosiphon comprising, within a bore hole, a nuclear reactor having a liquid inlet side and a liquid outlet side, three separate concentric annular chambers of approximately equal length above said reactor, control means for operating said reactor traversing the innermost chamber, said innermost chamber being provided with spent fuel storage racks intermediate the length thereof, said innermost chamber and said reactor being separated by an essentially liquid-tight barrier, the outermost annular chamber comprising a conduit for conducting liquid from the upper end thereof to the inlet side of the reactor, the size of the outermost chamber being sufficient to contain a reserve of water adequate to quench the reactor, the intermediate chamber between said innermost and outermost chambers comprising a plurality of annular conduits for conducting fluid from above the reactor to the upper end of said intermediate chamber, the lower end of said intermediate chamber containing a plurality of variable opening restrictions to control liquid flow entering said intermediate chamber and being adapted to suppress the vaporization of liquid in the reactor.

6. A thermosiphon comprising, within a bore hole, a nuclear reactor having a liquid inlet side and a liquid outlet side, three separate concentric annular chambers of approximately equal length above said reactor, control means for operating said reactor traversing the innermost chamber, said innermost chamber being provided with spent fuel storage racks intermediate the length thereof, said innermost chamber and said reactor being separated by an essentially liquid-tight barrier, the outermost annular chamber comprising a conduit for conducting liquid from the upper end thereof to the inlet side of the reactor, the size of the outermost chamber being sufficient to contain a reserve of water adequate to quench the reactor, the intermediate chamber between said innermost and outermost chambers comprising a plurality of annular conduits for conducting fluid from above the reactor to the upper end of said intermediate chamber, the lower end of said intermediate chamber containing a plurality of variable opening restrictions to control liquid flow entering said intermediate chamber and being adapted to suppress the vaporization of liquid in the reactor, and condensor means positioned above the upper ends of said concentric annular chambers.

7. A method for the generation of steam in a closed loop comprising continuously heating water in a heating zone comprising a nuclear reactor located in proximity to the bottom of the bore hole of a well under hydrostatic pressure to prevent substantial vaporization of the water around the nuclear reactor, the head of water above the reactor being sufficient to quench the reactor in the event an excursion occurs, reducing the hydrostatic pressure by means of a controllable restriction to provide partial vaporization above the restriction thereby causing a substantial reduction in density of the rising water column to promote a substantial hydrostatic driving force for circulation as the water circulates upward from said reactor, continuously condensing said vapor at the upper end of the said bore hole, and permitting the condensate together with the unvaporized water to be recycled by thermosiphoning action to said heating zone.

8. The method of claim 7 wherein the water is heated to a temperature up to about 300° F. in the heating zone.

References Cited

UNITED STATES PATENTS

| | | | |
|---|---|---|---|
| 1,924,850 | 8/1933 | Freiday | 122—235 |
| 3,114,353 | 12/1963 | Sprague | 122—34 |
| 3,150,051 | 9/1964 | Ammon | 176—53 |
| 3,213,833 | 10/1965 | Cunningham et al. | 122—34 |
| 3,245,881 | 4/1966 | Ammon et al. | 176—53 |
| 3,255,088 | 6/1966 | Sprague | 176—53 |
| 3,303,098 | 2/1967 | Lagowski | 176—39 |

REUBEN EPSTEIN, *Primary Examiner.*